United States Patent [19]

Tsutsumi et al.

[11] Patent Number: 5,043,593
[45] Date of Patent: Aug. 27, 1991

[54] OPTICAL THEFT DETERRENT SYSTEM

[75] Inventors: Shunsaku Tsutsumi; Takurou Ozawa, both of Tokyo, Japan

[73] Assignee: Kokusan Kinzoku Kogyo Kabushiki Kaisha, Tokyo, Japan

[21] Appl. No.: 377,904

[22] Filed: Jul. 10, 1989

[30] Foreign Application Priority Data

Jul. 11, 1988 [JP] Japan .................. 63-170802

[51] Int. Cl.$^5$ .................. E05B 49/02; H01H 27/00
[52] U.S. Cl. .................. 307/10.2; 180/287; 70/278; 250/229
[58] Field of Search ............. 361/171, 172, 160, 139; 307/10.2, 10.5, 311, 9.1, 10.1, 10.3; 70/278, D 51; 250/229, 215, 227; 340/531, 539, 425.5, 426, 825.31, 825.34, 825.69, 825.32; 180/287

[56] References Cited

U.S. PATENT DOCUMENTS

| | | | |
|---|---|---|---|
| 3,671,752 | 6/1972 | Bostrom | 250/227.21 |
| 4,258,352 | 3/1981 | Lipschutz | 340/53 |
| 4,298,792 | 11/1981 | Granholm et al. | 307/10.5 |
| 4,447,123 | 5/1984 | Page et al. | 250/227.15 |
| 4,868,409 | 9/1989 | Tanaka et al. | 361/171 |

FOREIGN PATENT DOCUMENTS 62-173354 7/1987 Japan .

Primary Examiner—A. D. Pellinen
Assistant Examiner—Richard T. Elms
Attorney, Agent, or Firm—Bachman & LaPointe

[57] ABSTRACT

A new optical theft deterrent device wherein a ray from a light source is divided by a beam splitter mounted on a key into a plurality of light beams which are detected by photosensors to determine authorized use of the key only when predetermined one or ones of the photosensors produce electrical outputs. The beam splitter serves to uniformly divide the ray from the light source into the light beams and also to accurately guide these beams toward the photosensors. The key may be utilized to mechanically and electrically unlock a locking device. The new system may preferably be applied to a steering column shaft locking device to prevent theft of an automotive vehicle on which the system is equipped.

4 Claims, 10 Drawing Sheets

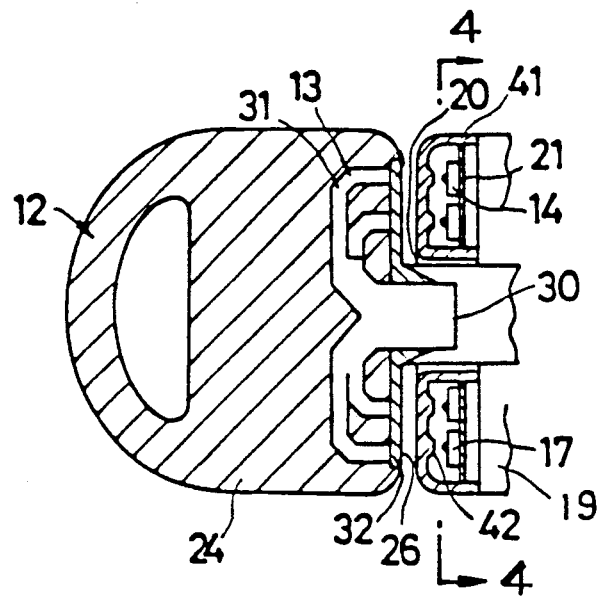
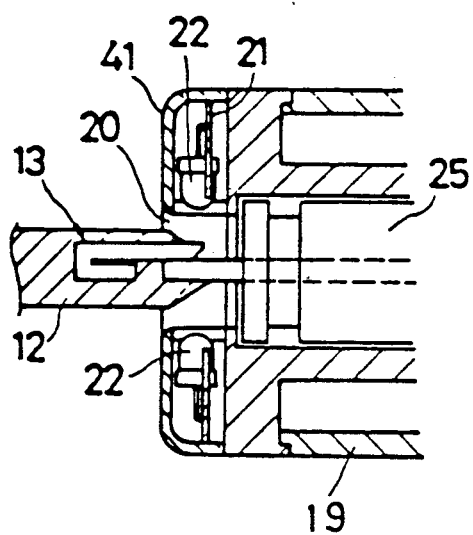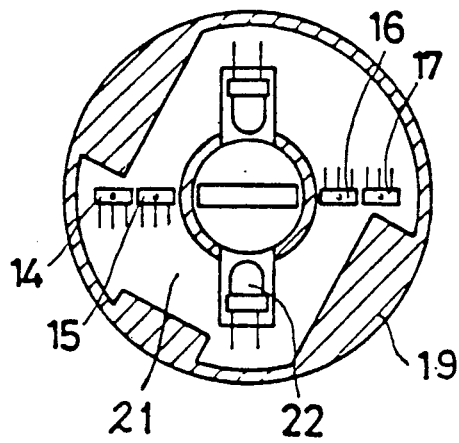

OPTICAL THEFT DETERRENT SYSTEM

BACKGROUND OF THE INVENTION a) Field of the Invention:

The present invention relates to electronic locking, especially to an optical theft deterrent system capable of optically providing a key code for authorized operation of a driven device.

b) Description of the prior art:

Since a U.S. patent was granted in 1848 to Linus Yale Sr. the inventor of a cylinder lock device, many types of mechanical cylinder lock devices have been utilized in buildings, automotive vehicles or other objects to prevent unauthorized access or use thereof. In another aspect, various types of electrically operated locking devices have been developed including keyless entry system and infra-red unlocking apparatus.

For example, Japanese Patent Disclosure No. 62-173354 exhibits an anti-theft device which comprises a combination of mechanical and electronic locking devices. The electronic locking device may be unlocked upon receiving an infra-red ray including a specific key coded optical signal emitted from a key. Specifically, an electric circuit mounted on the key comprises means for producing the coded optical signal, and the locking device comprises identifying means for producing a trigger signal to unlock a locking apparatus upon receiving the coded optical signal emitted from the key. In this combined mechanical and electronic locking structure, the anti-theft device can not be unlocked unless mechanically operated by a proper key in addition to the electric trigger signal resulted from the coded optical signal. As the device further comprises output means for detecting "picking", if the anti-theft device is unlocked only by mechanical operation without the trigger signal of the identifying means to be generated upon receiving the optical signal, it produces a "picking" detecting signal in order to drive a warning device. The term "picking" is used to mean the unauthorized unlocking of a mechanical locking device by means of a specific tool. In this tamper-proof structure, if the identifying means generates the trigger signal after the device has received the specific coded optical signal emitted from the key and simultaneously the device is mechanically unlocked, the warning device can not be activated.

Then, Japanese Patent Publication No. 62-174476 discloses an electronic control apparatus for buildings and automobiles which comprises an electronic key for generating light signals of predetermined coded signals; identifying means for producing a trigger signal upon receiving the matching light signals; and a lock mechanism actuated by the trigger signal from the identifying means. This electronic control apparatus further comprises a battery; switching means; a switching circuit connected to the battery and switching means; coded signal generating means activated by output of the switching circuit; and a light source element for generating specific coded light signals in accordace with outputs of the coded signal generating means. The light signals emitted from the light source element are received by a photosensor connected to the identifying means which consequently provides an output to actuate the lock mechanism when the signals received by the photosensor match predetermined coded signals.

Also, Japanese Patent Publication No. 56-11032 exhibits a lock device which comprises a lock mechanism for electrically operating a lock actuator; and a key device provided with a transmitter. Provided in each of the lock and key devices is a pulse pattern generator which generates a specific array of pulses in synchronized relation to serial clock signals generated in an oscilator of the key device. The lock and key devices are connected through the light transmitter so that the lock actuator of the lock mechanism is operated for unlocking when the array of pulses produced in the key device coincides with that produced in the lock device.

In addition, U.S. Pat. No. 4,258,352 shows a device for controlling a lock for an automotive vehicle which comprises a transmitter independent of the vehicle and a receiver fast with the vehicle. The transmitter includes a direct current electric supply source, a coded message generator and an emitter for transmitting the message away in series. The receiver includes a battery, a detector for receiving the message from the transmitter, a memory for storing only a coded message, and a comparator for comparing the messages received by the detector and stored by the memory and producing a signal when these messages are identical. The emitter of the transmitter has a diode capable of producing infra-red radiation, and the detector of the receiver has a photodiode.

As above-mentioned, prior art optical transmitters requires a complicated electronic circuit including a battery, a coded pulse generator, an emitter and so on, and therefore these electronic parts make it difficult to mount the transmitter on a small key. Also, the complicated electronic structure results in increased processes and cost for manufacture of the transmitter. In addition, no change of the coded signals can be made by storing new ones in prior art transmitters.

SUMMARY OF THE INVENTION

Accordingly, an object of the present invention is to provide a new optical theft deterrent system including a key which supports only a beam splitter.

Another object of the instant invention is to provide an optical theft deterrent device of small size manufactured at lower cost to overcome the defects mentioned hereinbefore.

A further object of the invention is to provide an optical theft deterrent device which may be conveniently combined with mechanical locking structures.

A still another object of the invention is to provide an optical theft deterrent device capable of storing new coded signals.

A still further object of the invention is to provide a beam splitter capable of providing optical coded signals.

A still further object of the invention is to provide an optical theft deterrent device applicable to a steering column shaft locking device and also to control a starter motor of an automotive vehicle.

According to the instant invention, the optical theft deterrent system is provided which comprises the steps of emitting an infra-red or visible ray from a light source, dividing the ray into a plurality of light beams by a beam splitter to provide coded optical signals, detecting the divided rays by corresponding photosensors, and producing an unlocking signal when predetermined one or ones of the photosensors generates outputs.

The ray is divided into at least four light beams by the beam splitter, and at least one of the light beams is prevented from being emitted on one of the photosensors to provide various optical key codes, for example by cutting off or interrupting one or more of light paths formed in the beam splitter. The light beams are angularly deflected by approximately 180 degrees along light paths defined by the beam splitter.

In the optical theft deterrent device of the present invention, it comprises a light source for producing a ray; a beam splitter for receiving and dividing the ray into a plurality of light beams; a plurality of photosensors for generating outputs upon receiving the divided light beams emitted from the beam splitter; a comparator for producing an output only when predetermined ones of the photosensors receives the divided light beams, and a driven device operated by the output from the comparator.

The beam splitter is made of a light permeable material such as acrylic resin, polycarbonate or glass, and may comprise an input end for receiving the ray from the light source, a transmitting portion having four optical paths divided from the input end, and an output end formed at each end of the optical paths. The beam splitter is encapsulated by a light impermeable or opaque resin material which may form a key head so that the transmitting portion of the beam splitter is mounted within the key head. The output end of the beam splitter is concealed by a cover made of infra-red permeable material.

The optical theft deterrent device may further comprises code storage means for storing signals which are representative of a specific key code; and a comparator for comparing the coded signals stored in the code storge means with outputs of the photosensors and for producing an output to operate the driven device when the outputs of the photosensors match the signals from the code storage means; and switching means for changing the code storage means to a reading mode wherein the code storage means supplies the coded signals to the comparator or to a writing mode wherein the code storage means stores new coded signals received by the photosensors.

In accordance with another embodiment of the present invention, the optical theft deterrent device comprises a steering column shaft locking device for supporting the light source and photosensors around a key hole of the locking device, the photosensors being arranged in a row and in angularly spaced relation to the light source. Provided at the end of the locking device is a cap made of an infra-red ray permeable but visible ray impermeable resin to conceal the photosensors. Also, a starter relay is provided to make a starter motor energized only when it receives the output from the comparator.

Moreover, the invention provides a beam splitter which comprises an input end for receiving a ray from a light source; a transmitting portion having a plurality of optical paths divided from the input end; an output end formed at each end of the optical paths; a first reflective surface for reflecting the light beam straightly passing through the transmitting portion substantially at a right angle; branched portions for dividing the ray into a plurality of light beams along the optical paths; and a second reflective surface for directing divided light beams to the corresponding one of the output ends.

The first reflective surface of the beam splitter is a paraboloid whose focus is placed in the light source in a spaced relation to the input end. A third inclined reflective surface is provided at the input end on which the ray from the light source reflects toward the first reflective surface. The total surface of the beam splitter is mirror-finished. The second reflective surface further reflects substantially at a right angle the light beam reflected on the first reflective surface. In another embodiment of the invention, the first reflective surface is inclined at an angle slightly smaller than a critical angle on the first reflective surface.

In the optical theft deterrent system of the invention, the infrared or visible ray radiated from the light source goes into a beam splitter which includes branched optical paths. Then, passing through the branched optical paths, the ray is divided into a plurality of light beams by the beam splitter. Although the ray is divided into at least four light beams by the beam splitter, at least one of the light beams is prevented from being emitted on one of the photosensors to provide an optical key code, for example by cutting off or interrupting one or more of light paths formed in the beam splitter. Subsequently, the divided light beams are detected by the corresponding photosensors, predetermined one or ones of which serve to produce an unlocking signal.

After the ray enters the input end of the beam splitter, it is reflected on the third inclined reflective surface of the input end toward the first reflective surface through the transmitting portion. Since the total surface of the beam splitter is mirror-finished, the light ray can not go out of the beam splitter when they inwardly reflect on outer surface thereof encapulated by the key head. The ray reflected on the third surface is directed to the first reflective surface. The ray is divided on the first reflective surface into two light beams along branched two optical paths of the beam splitter. As the first reflective surface is formed into paraboloid or an inclined surface at an angle slightly smaller than a critical angle on the first reflective surface in order to reflect the light beams substantially at a right angle toward the second reflective surface. Each light beam is then divided on the way into two light beams by branched light paths and is again reflected substantially at a right angle toward the output end of the beam splitter. Accordingly, the light beams passing through the light paths defined by the beam splitter are angularly polarized or deflected by approximately 180 degrees. Emitted out of the output end, each light beam is directed to the corresponding photosensor. However, since one or more output ends are treated to prevent emission of the light beam, light beams are radiated only from predetermined output ends of the beam splitter and are detected by the photosensors. The comparator of the optical theft deterrent device produces an output only when predetermined ones of the photosensors receive the divided light beams to actuate the driven device.

In an embodiment of the invention, the beam splitter is attached to the key so that the locking device may be actuated only when optical and mechanical key codes match the corresponding electric and mechanical key codes set within the locking device.

Usually, the code storage means is held in a reading mode so that the coded signals stored in the code storage means are supplied to the comparator. If the switching means shifts the code storagte means from the reading to a writing mode, the code storage means may store new coded signals received by the photosensors in lieu of previously stored signals.

If the optical theft deterrent device is attached to a steering column shaft locking device, the light source and photosensors can be mounted around a key hole of the locking device so as to activate the starter motor only when the mechanical and optical codes simultaneously coincide with those retained within the locking device.

The above-mentioned as well as other objects of the present invention will become apparent during the course of the following detailed description and appended claims.

BRIEF DESCRIPTION OF THE DRAWINGS

FIG. 2 is a partial section view of the steering column shaft locking device into which a key is inserted;

FIG. 3 is another section view angularly spaced by 90 degrees from the section shown in FIG. 2.

FIG. 4 is a section view taken along an A—A line of FIG. 2.

Referring now to FIGS. 1 to 18, some embodiments of the pesent invention will be described in connection with a steering column shaft locking device of an automotive vehicle to which the invention is applied.

As shown in FIG. 1, the optical theft deterrent device 10 according to the present invention includes a key 12 having a key head 24 formed of a light impermeable or opaque resin material, and a steering column shaft locking device 19 mounted in an automotive vehicle (not shown).

Figure 1:
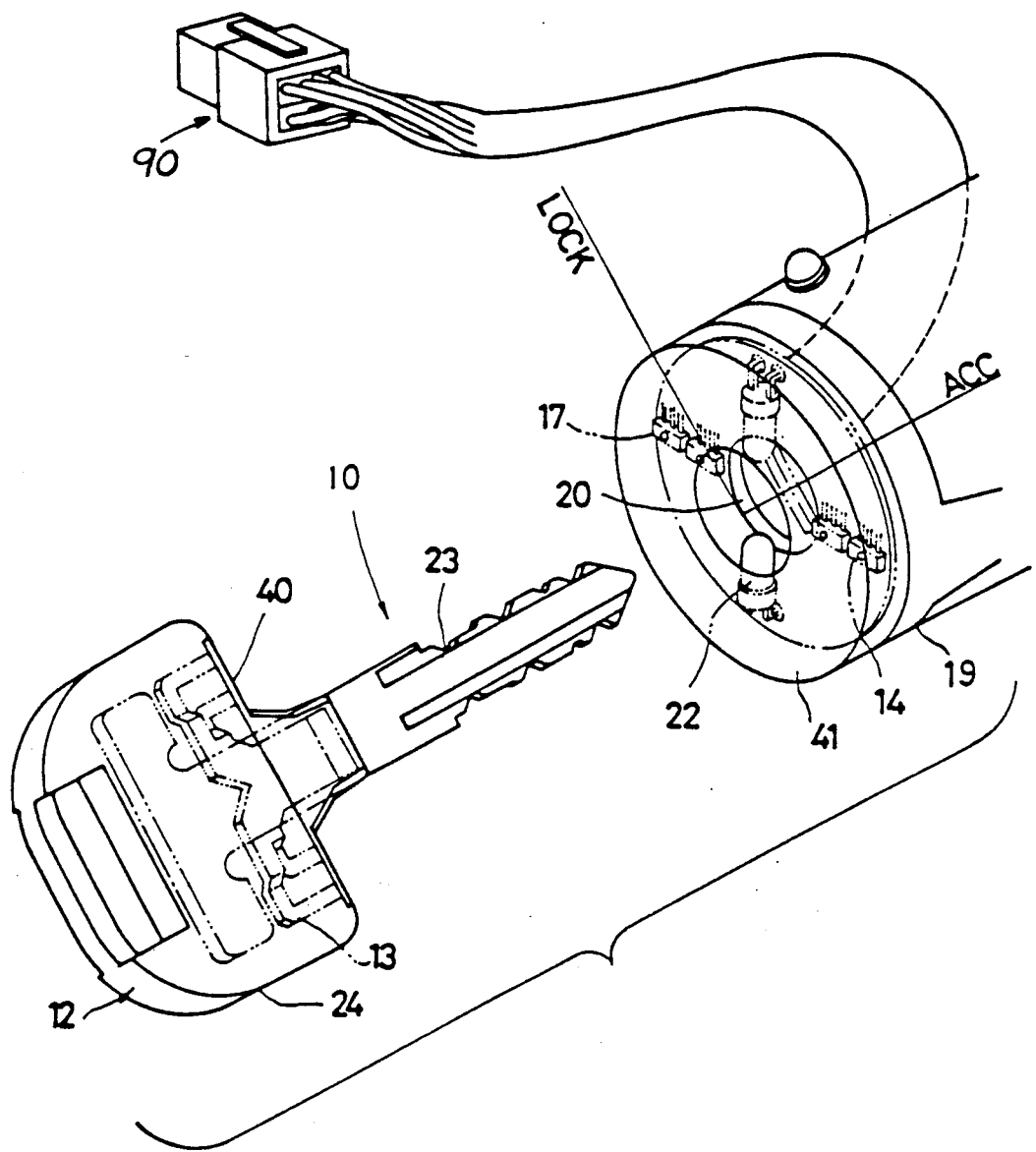
FIG. 1 is a perspective view of the optical theft deterrent device according to the present invention which is carried out for a steering column shaft locking device.

As seen from FIGS. 2 and 3, a light emitter includes a base board 21 disposed in proximity of a key hole 20 of the steering column shaft locking device; and a light source including a pair of first and second infra-red emitting diodes 22 positioned on opposite sides of the key hole 20. Also, in FIG. 4, photosensors 14 to 17 of photodiodes are located in a line in angularly spaced relation to the diodes 22 by 90 degrees. A key 12 FIG. 1 comprises a metallic key blade 23, the head 24 formed of synthetic resin on one end of the key blade 23 and a beam splitter 13 provided within the key head 24. The key blade 23 of the key 12 may be inserted into the key hole 20 formed in a key cylinder 25 FIG. 3 which is rotatably supported within the steering column shaft locking device 19 during locking or unlocking operation.

Figure 5:
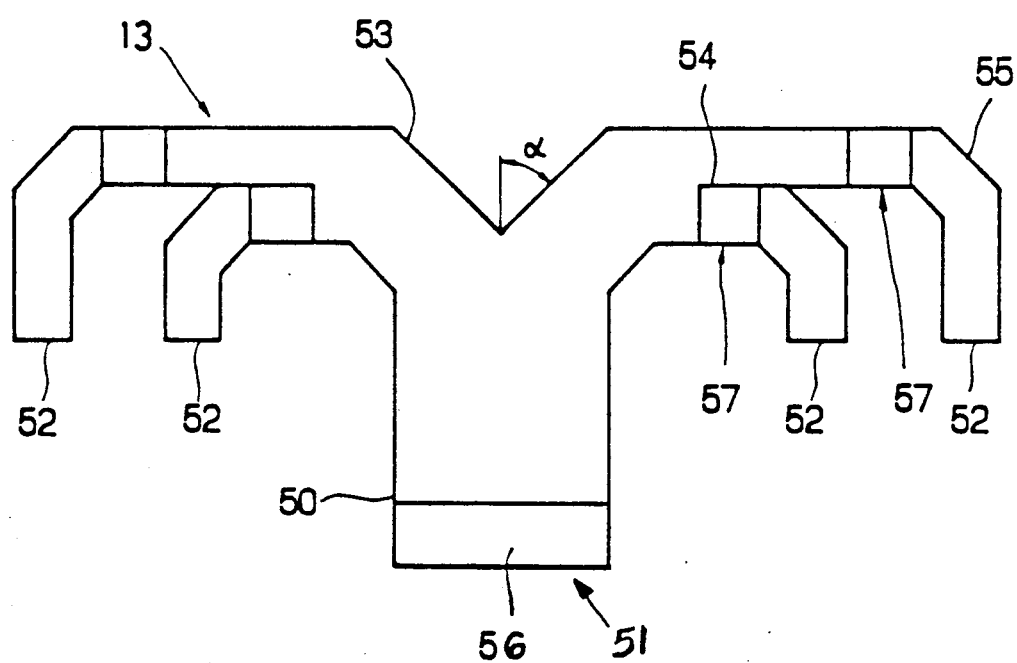
FIGS. 5, 6 and 7 are respectively plan, bottom and side elevation views of a beam splitter.
Figure 6:
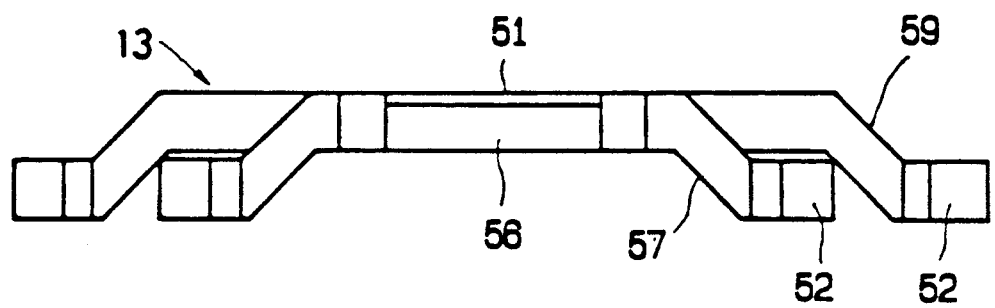
Figure 7:
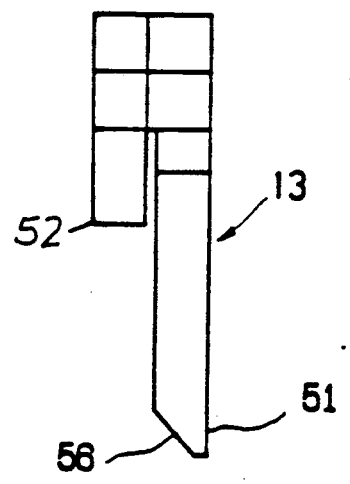

The beam splitter 13 shown in FIGS. 5 to 7 is made of a light or infra-red ray permeable material such as silicone or acrylic resin. It comprises an input end 51, a transmitting portion 50 including four branched paths divided from the input end 51, and an output end 52 formed in each branched path opposite to the input end 51. The input end 51 is optically exposed out of the key head 24 on a side of the key blade 23 to receive a ray emitted from the one of infra-red emitting diodes 22. Current keys for door locks of automotive vehicles are generally a reversible type wherein before and also after angularly turning them by 180 degrees around their longitudinal axis, they may be inserted and rotated within the locks for locking and unlocking. To this end, a pair of the first and second diodes 22 is provided with one facing the other in angularly spaced relation by 180 degrees so that the output end 52 may receive a ray emitted from at least one of the diodes 22 even when the key 12 shown in FIG. 3 is turned by 180 degrees around its longitudinal axis and inserted into the key cylinder 25.

Each of the optical paths of the beam splitter 13 extends in the key head 24, and each end surface of the output ends 32 is optically exposed from the key head 24, but is concealed by a cover 26 made of infra-red ray permeable material. The beam splitter 13 includes a first reflective surface 53 for reflecting at a right angle the light beam straightly parallel passing through the transmitting portion 50 substantially; branched portions 57 for forming the optical paths for dividing the ray into the optical paths; and a second reflective surface 55 for directing light beams to corresponding one of the output ends 52.

Figure 8:
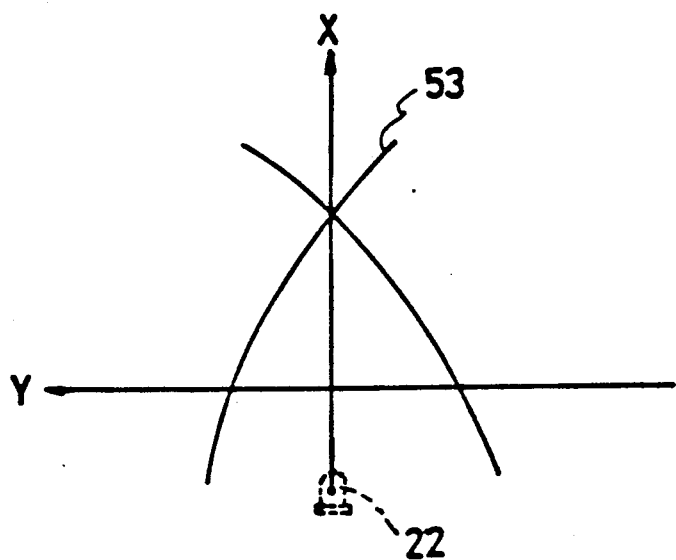
FIG. 8 is a graph of parabolas indicating profile of a first reflective surface formed in the beam splitter.
Figure 10:
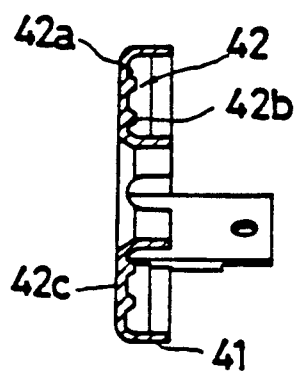
FIGS. 10 and 11 are respectively section and rear views of a cap attached to the locking device.
Figure 11:
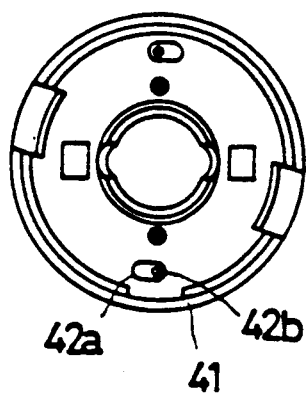
Figure 12:
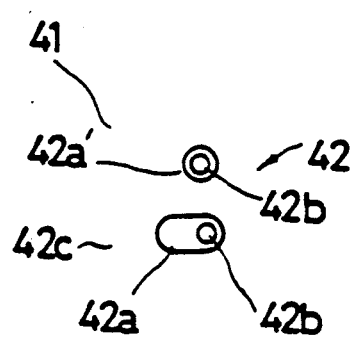
FIG. 12 illustrates protrusions formed on an inner surface of the cap.

As shown schematically in FIG. 8, the first reflective surface 53 of the beam splitter 13 is a paraboloid whose focus is placed in one of the diodes 22 in a spaced relation to the input end 51. The third inclined reflective surface 56 is provided at the input end 51 on which the ray from the light source reflects toward the first reflective surface 53. The total surface of the beam splitter 13 is mirror-finished. The second reflective surface 55 reflects substantially at a right angle the light beam deflected before on the first reflective surface 53. In another embodiment of the invention, the first reflective surface 53 may be formed into an inclined surface at an angle slightly smaller than a critical angle on the first reflective surface 53. In the shown embodiment, although the ray is divided into at least four light beams by the beam splitter 13, at least one of the light beams is prevented from being emitted on one of the photosensors 14 to 17 to provide an optical key code, for example by cutting off or interrupting one or more of branched portions 57 or by light-sealing one or more of the output ends 52. Subsequently, the divided light beams are detected by the corresponding photosensors 14 to 17, predetermined one or ones of which serve to produce an unlocking signal. A cap 41 made of an infra-red ray permeable but visible ray impermeable resin is attached on the locking device 19 to conceal the photosensors 14 to 17. As shown in FIGS. 10 to 12, four converging conical protrusions 42 are formed on an inner surface of the cap 41, each facing the corresponding photosensor 14 to 17. Each protrusion 42 and 42a' respectively has a root portion 42a secured to the inner surface of the cap 41 and a top portion 42b protruded from the root portion. As shown in FIG. 12, the root portion 42a of the radially outward protrusion 42 is larger than that of the radially inward one (42a') so that the light beams radiated from each of four output ends 52 may be detected by the photosensors 14 to 17 at once, thereby avoiding error in detecting operation of the photosensors 14 to 17. The converging protrusions 42 serve to prevent divergence of the light beams toward the photosensors 14 to 17.

When the key 12 is inserted into the key cylinder 25 of the lock and turned from LOCK to START position, infra-red ray is emitted from each of the diodes 22 and it goes into the input end 51 of the beam splitter 13. After the ray enters the input end 51, it is reflected on the third inclined reflective surface 56 of the input end 51 toward the first reflective surface 53 through the transmitting portion 50. Since the total surface of the beam splitter 13 is mirror-finished, the light ray can not go out of the beam splitter 13 when they inwardly reflect on outer surface thereof encapsulated by the key head 24, thereby decreasing leakage of light. The ray passing on the way from the third reflective surface 56 toward the first reflective surface 53 is uniformly divided into two light beams along the branched portions 57 of the beam splitter 13. As the first reflective surface 53 is formed into paraboloid or an inclined surface at an angle slightly smaller than a critical angle on the first reflective surface 53 in order to reflect the light beams substantially at a right angle toward the second reflective surfaces 55. Each light beam is then uniformly divided on the way into two light beams along the branched portions 57 and is again reflected substantially at a right angle toward each output end 52. Accordingly, the light beams passing through the light paths defined by the beam splitter 13 are angularly deflected by approximately 180 degrees. Emitted out of the output end, each light beam is directed to the corresponding photosensors 14 to 17. However, since one or more output ends 52 are treated to prevent emission of the light beam, light beams are radiated only from predetermined output ends 52 of the beam splitter 13 and are detected by the photosensors 14 to 17. In other words, one or some of the output ends 32 are selectively cut off to give an optical key code which is determined by combination of existence and absence of light beams transmitted to the photosensors 14 to 17.

Figure 9:
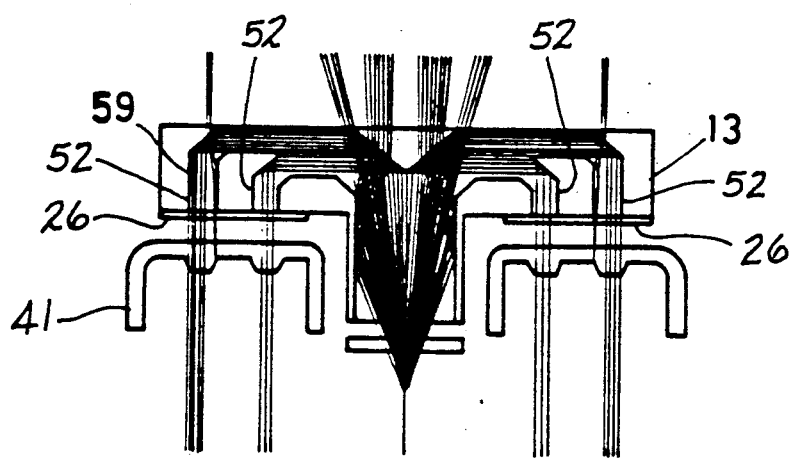
FIG. 9 indicates simulated optical passages of light beams passing through the beam splitter.

FIG. 9 indicates optical passages of light beams similated by a computer when these beams pass through the beam splitter 13. As well understood from FIG. 9, each light beam going out of the output end 52 is radiated with the accurate directivity on the corresponding photosensor 14 to 17.

Figure 13:
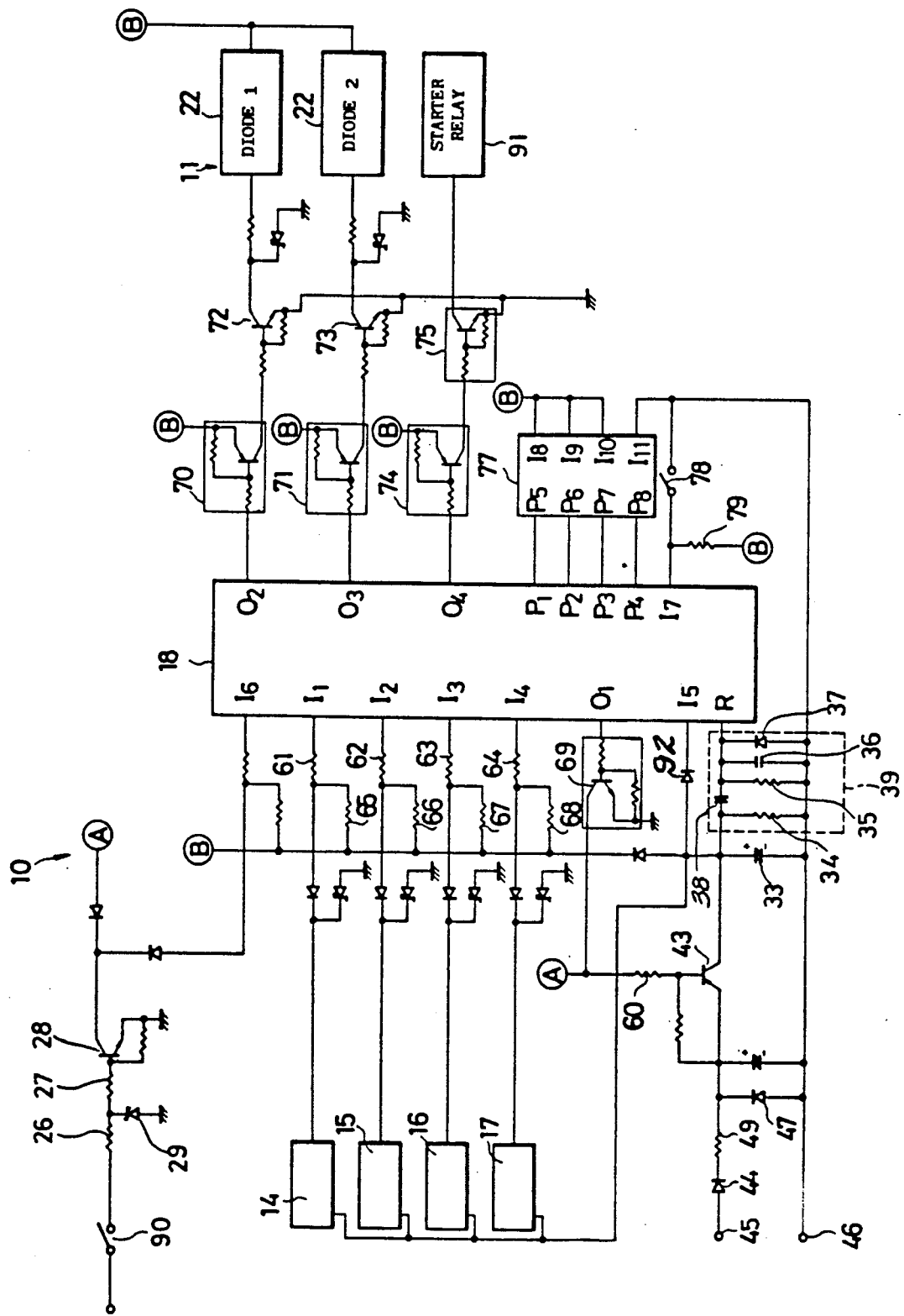
FIG. 13 is an electric circuit utilized in the optical theft deterrent device.

Referring now to FIG. 13 indicating an electric circuit to operate the device of the invention, a positive terminal 45 lead to an anode electrode of a battery (not shown) is connected to an emitter of a transister 43 through a diode 44 and resistor 49. A collector of the transister 43 is connected to a reset terminal R of a drive control circuit 18 via a reset circuit 39. A voltage regulating diode 47 is connected between the emitter of transistor 43 and a negative terminal 46 which is connected to a cathode electrode of the battery. Each one end of a resistor 34 and a capacitor 33 is connected to a capacitor 38 of the reset circuit 39, and each other end thereof is connected to the negative terminal 46. A resistor 35, capacitor 36 and diode 37 are connected in parallel between the negative terminal 46 and reset terminal R which is also lead to the capacitor 38. The capacitor 38 and resistor 35 provide a pulsing circuit to supply the reset terminal R with a pulse.

A switch 90 shown in FIG. 1 serves for example as an ignition or starter switch to introduce an electric current into a base of a trasistor 28 through resistors 26 and 27 upon ON of the switch 90. A voltage regulating diode 29 is connected between the resistors 26 and 27. An emitter of the transistor 28 is connected to ground and a collector thereof is connected to a base of the transistor 43 through a resistor 60. Also, the base of the transistor 43 is connected to a collector of a transistor 69, the base of which is connected to an output port $O_1$ of the drive control circuit 18 with the emitter of the transistor 69 being led to ground. Then, the collector of the transistor 28 is connected to an input port $I_6$ of the drive control circuit 18. Upon ON of the transistor 28, the voltage level of the input port $I_6$ becomes low, and timer means provided in the drive control circuit 18 turns the latter to the operative mode from the standby mode for a certain period of time. When this period of time has lapsed in the operative mode, the timer means produces an output from the output port $O_1$, thereby turning the transistor 69 to ON. Therefore, the transistor 43 is turned to OFF since the voltage level in the base of the transistor 43 becomes low so that the drive control circuit 18 is shifted from the operative to the standby mode.

The photosensors 14 to 17 are connected respectively to input ports $I_1$ to $I_4$ of the drive control circuit 18 through resistors 61 to 64. Also, all of the photosensors 14 to 17 are connected to the collector of the transistor 43 respectively through resistors 65 to 68. Moreover, the collector of the transistor 43 is connected to an input port $I_5$ of the drive control circuit 18 for power supply through a diode 90.

Output ports $O_2$ and $O_3$ of the drive control circuit 18 are connected to the corresponding infra-red emitting diodes 22 respectively through first and second amplifiers 70 and 73. An output port $O_4$ of the circuit 18 is connected to the starter relay 91 through first and second amplifiers 74 and 75. The starter relay 91 provides a driven device operated by the output from the comparator within the drive control circuit 18. If the starter relay 91 is energized, electric power may be supplied to activate a starter motor, but if the starter relay 91 is not energized, electric power to the starter motor is interrupted. Also, ports $P_1$ to $P_4$ are connected to corresponding ports $P_5$ to $P_8$ of ROM (Read Only Memory) 77 which stores infomation equal to four bit coded signals received by the photosensors 14 to 17. Input terminals $I_8$ to $I_{10}$ of ROM 77 are connected to the collector of the transistor 43, and an input terminal $I_{11}$ is connected with the negative terminal 46. A memory switch 78 is connected between the negative terminal 46 and an input port $I_7$ of the circuit 18 which is also connected to the collector of the transistor 43 through a resistor 79. Each pair of A, A and B, B in FIG. 1 indicate connected terminals.

The circuit 18 may be constituted by a one-chip microcomputer which comprises timer means; code storage means; and comparator means for comparing coded signals stored in the code storge means with outputs of the photosensors 14 to 17 and for producing an output when the outputs of the photosensors 14 to 17 match signals from the code storage means. As these means may be operated under the operative sequence shown in FIG. 14, neither of these means is shown in the drawings. When the transistor 28 is turned ON an input is applied to the input port $I_6$ and thereby the drive control circuit 18 is shifted from the standby to the operative mode. The timer means functions to automatically return the drive control circuit 18 from the operative to the standby mode after a given time has lapsed since the change to the standby mode. The code storage means stores coded signals received by the photosensors 14 to 17 while the memory switch 78 is turned ON. Therefore, the memory switch 78 provides change means for changing the code storage means to the reading mode wherein the code storage means supplies coded signals to the comparator or to the writing mode wherein the code storage means stores new coded signals received by the photosensors 14 to 17 in lieu of the signals stored before.

Figure 14:
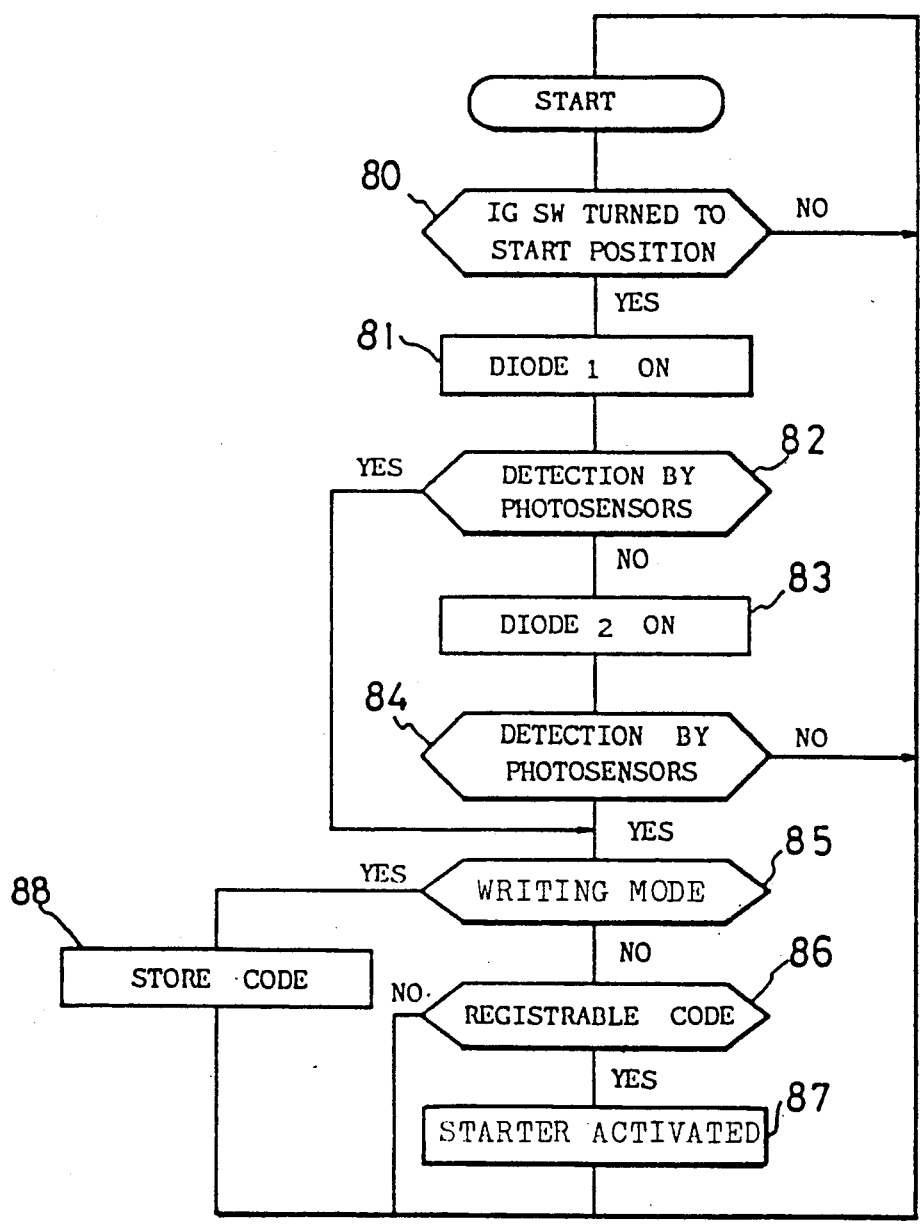
FIG. 14 indicates a flow chart of operative sequence of the electric circuit shown in FIG. 13.
Figure 15:
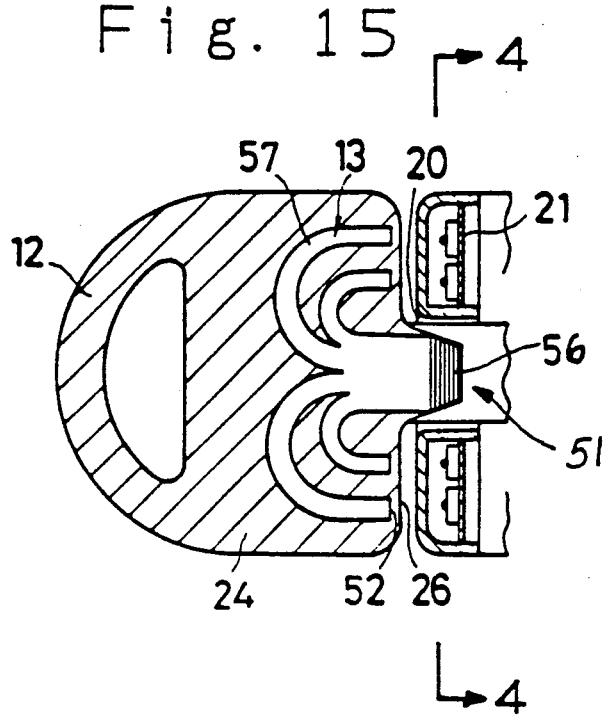
FIG. 15 is a partial section view of the steering column shaft locking device into which a key is inserted in another embodiment of the invention.
Figure 16:
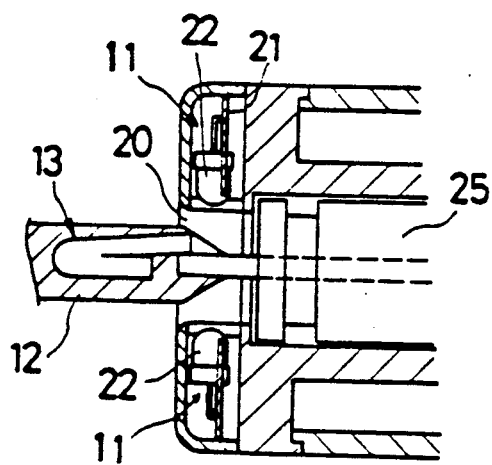
FIG. 16 is another section view angularly spaced by 90 degrees from the position shown in FIG. 15.
Figure 17:
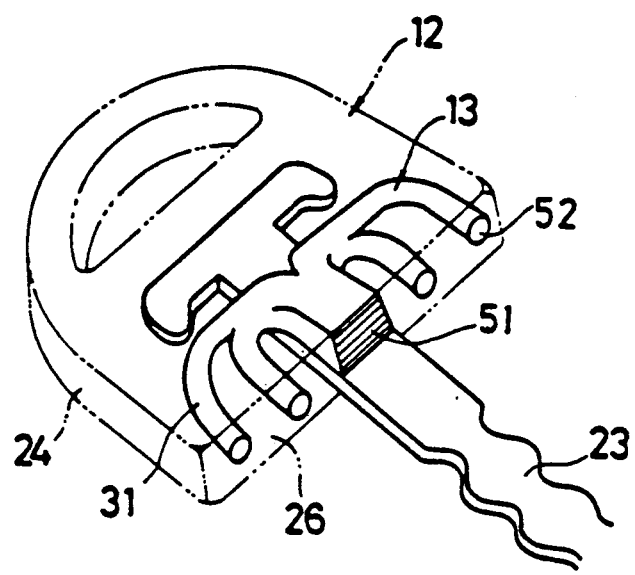
FIG. 17 is a perspective view of the key shown in FIG. 15.
Figure 18:
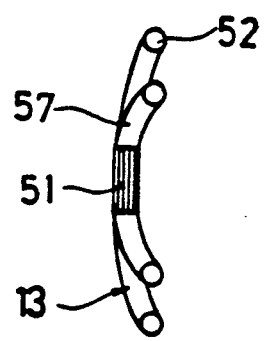
FIG. 18 is a bottom view of the beam splitter shown in FIG. 15.

Referring now to FIG. 14 indicating the oparative sequence of the the foregoing circuit, operation of the optical theft deterrent device in accordance with the present invention is described as follows.

In START of FIG. 14, the key 12 is inserted into the key cylinder 25 of the steering column shaft lock, and is turned from LOCK to START position, thereby the locking mechanism of the steering column shaft locking device 19 is unlocked. At the same time, by rotation of the key 12 to START position, the switch 90 as a starter switch is turned ON. In step 80 of FIG. 14, the timer means detects the ON condition of the switch 90 for advance to step 81. As the transistor 58 is turned ON due to the closing of the switch 90, a trigger signal is supplied to the input port $I_6$ of the drive control circuit 18 and simultaneously the transistor 43 is turned ON. Accordingly, a reset signal is applied to the reset terminal R of the circuit 18 through the reset circuit 39 to reset the circuit 18. When the trigger signal is fed to the input port $I_6$ of the circuit 18, the timer means is activated so that the circuit 18 is shifted from the standby to the operative mode for a certain period of time, and simultaneously the first diode 22 of the light emitters 11 is turned ON in step 81.

Then, the ray emitted from the first diode 22 enters the beam splitter 13 from the input end 51, and goes out of the output ends 52. In this condition, since the key 12 is retained in START position, the light beam going out of each output end 52 is received by the corresponding photosensors 14 to 17. However, if none of the photosensors 14 to 17 can receive any light beam in step 82, decision is made on insertion of the reversible type of the key 12 into the key cylinder 25 because the input end 51 is in angularly spaced relation to the first diode 22 by 180 degrees, and therefore is unable to receive the light beam from the first diode 22. For that reason, the second diode 22 of the light emitter 11 is turned ON (in step 83). Then, when the photosensors 14 to 17 can not receive any light beam, the drive control circuit 18 decides the key as improper in step 84 and returns to START.

If the photosensors 14 to 17 detect an optical input in step 82 or 84, the code storage means of the circuit 18 distinguishes the writing or reading mode. In other words, the circuit 18 detects the writing and reading mode in response to respectively ON and OFF of the memory switch 78. For instance, if the memory switch 78 is in OFF for the reading mode, the comparator means determines in step 86 whether or not the optical signals received by the photosensors 14 to 17 are equal to information stored in ROM 77. If the optical signals match that information, operation of the circuit 18 is advanced from step 86 to 87, and the comparator means generates from the output port $O_4$ an output which is fed through the first and second amplifiers 74 and 75 to the starter relay 91, thereby allowing energization of a starter motor (not shown) to start an engine of the automotive vehicle. In contrast thereto, if the optical signals received by the photosensors 14 to 17 are unequal to the information stored in ROM 77, no output is produced from the output port $O_4$ and therefore the starter motor can not be activated. In this manner, the comparator may produce the output to activate the starter relay 91 only when predetermined ones of the photosensors 14 to 17 receives the divided light beams.

After a predetermined period of time set by the timer means has lapsed, the output $O_1$ forwards an output to the base of the transistor 69 which is therefore turned ON. In turn, the transistor 43 is switched to OFF so that the circuit 18 is shifted from the operative to the standby mode.

In step 85, if the memory switch 78 is in ON for the writing mode, the optical signals received by the photosensors 14 to 17 are stored in RAM (Random Access Memory) or Programmable ROM 77 as code storage means of the circuit 18 in lieu of previously stored signals and, since then, the comparator means compares newly stored information and optical signals received by the photosensors 14 to 17.

FIGS. 15 to 18 exhibit another embodiment of the invention utilizing a beam splitter 13 which includes arcuate branched portions 57. Similarly to the foregoing embodiment, the beam splitter 13 is encapsulated within a key head 24.

In the foregoing embodiment, the present invention is applied to the steering column shaft locking device for automotive vehicles. It is, however, apparent that the invention may be also applied to other locking devices for automotive vehicles or buildings, etc and to control of various driven device to prevent the unauthorized access or operation thereof. Also, in the above-mentioned embodiment, if diodes are utilized to produce an invisible infra-red ray beam, antitheft effect is increased since nobody can see with one's eyes which output end 52 is effective to transmit a light beam to the corresponding photosensor. However, in the present invention, other types of diodes may be used to produce visible light beams. Furthermore, the driven device may include electrically operated locking means, fuel control means or other various means than starter relay.

As mentioned above, there is no need of providing a complicated transmitter in a key according to the present invention so that the optical theft deterrent device of small size is obtained at lower cost. In addition, if necessary, new coded signals may be stored in code storage means, thereby resulting in great enhancement of theft prevention.

What is claimed is:

1. An optical theft deterrent system comprising key means and lock means;
    said key means including a key blade and a key head, said key blade being provided with notches for mechanical key code, said key head including a beam splitter which comprises an input end for receiving a ray; a transmitting portion having a plurality of optical paths divided from said input end for optical key code; an emitting end formed at each end of said optical paths;
    said lock means comprising electric lock means and mechanical lock means operable by said key blade of the key means;
    said electric lock means including a light source for producing the ray; switching means provided in said lock means and being turned on to radiate the ray from the light source toward the input end of the beam splitter when said mechanical lock means is unlocked by the key means; a plurality of photosensors for selectively receiving rays forwarded from said emitting ends of the beam splitter; a comparator for producing a drive signal only when a predetermined combination of said photosensors generates an output; and a driven device operated by the drive signal from said comparator.

2. An optical theft deterrent system as defined in claim 1 wherein said light source includes two infra-red emitting diodes positioned angularly apart from said photosensors.

3. An optical theft deterrent system as defined in claim 1 wherein said beam splitter is T-shaped.

4. An optical theft deterrent system as defined in claim 1 wherein at least one of the output ends of the beam splitter is cut off or interrupted to prevent emission of the light beam on corresponding one of said photosensors.

* * * * *